US008770391B2

(12) United States Patent
Gibbs et al.

(10) Patent No.: US 8,770,391 B2
(45) Date of Patent: Jul. 8, 2014

(54) CONVEYOR BELT CRADLE IMPACT BED

(71) Applicant: ASGCO Manufacturing, Inc., Allentown, PA (US)

(72) Inventors: Aaron T. Gibbs, Easton, PA (US); William Robert Agans, Bethlehem, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 14/013,640

(22) Filed: Aug. 29, 2013

(65) Prior Publication Data

US 2014/0061006 A1 Mar. 6, 2014

Related U.S. Application Data

(60) Provisional application No. 61/697,589, filed on Sep. 6, 2012.

(51) Int. Cl.
*B65G 15/08* (2006.01)
*B65G 15/62* (2006.01)

(52) U.S. Cl.
CPC ............... *B65G 15/08* (2013.01); *B65G 15/62* (2013.01)
USPC .......................................... 198/823; 198/841

(58) Field of Classification Search
CPC .... B65G 15/08; B65G 15/62; B65G 2201/04; B65G 2207/28
USPC .......................................... 198/818, 823, 841
See application file for complete search history.

(56) References Cited

U.S. PATENT DOCUMENTS

| | | | | |
|---|---|---|---|---|
| 4,793,470 | A | 12/1988 | Andersson | |
| 5,038,924 | A | 8/1991 | Stoll | |
| 5,103,967 | A * | 4/1992 | Stoll | 198/823 |
| 5,350,053 | A * | 9/1994 | Archer | 198/823 |
| 5,368,154 | A | 11/1994 | Campbell | |
| 6,394,262 | B1 * | 5/2002 | Stoll et al. | 198/825 |
| 6,454,083 | B2 * | 9/2002 | Burkhart et al. | 198/823 |
| 6,913,138 | B2 * | 7/2005 | Wiggins | 198/841 |
| 7,467,707 | B1 * | 12/2008 | Gabhart | 198/818 |
| 7,527,144 | B2 * | 5/2009 | Ostman | 198/823 |
| 7,815,040 | B2 * | 10/2010 | Kuiper et al. | 198/823 |
| 7,837,030 | B2 * | 11/2010 | Daly et al. | 198/861.1 |
| 8,408,385 | B2 * | 4/2013 | Swinderman | 198/860.1 |
| 2002/0011400 | A1 | 1/2002 | Burkhart et al. | |
| 2008/0006514 | A1 | 1/2008 | Ostman | |

OTHER PUBLICATIONS

International Search Report for corresponding PCT Application No. PCT/US2013/057512, dated Dec. 9, 2013.

* cited by examiner

*Primary Examiner* — James R Bidwell
(74) *Attorney, Agent, or Firm* — Caesar, Rivise, Bernstein, Cohen & Pokotilow, Ltd.

(57) ABSTRACT

An impact bed for supporting a conveyor belt in a troughing configuration. The impact bed has a plurality of resilient impact bars running lengthwise in a travel direction of the conveyor belt. The plurality of resilient impact bars includes at least a first resilient impact bar having a planar orientation, a second resilient impact bar having a troughing angled orientation and a third resilient impact bar between the first resilient impact bar and second resilient impact bar. The third resilient impact bar has an intermediate angled orientation that is greater than the planar orientation of the first resilient impact bar and less than the troughing angled orientation of the second resilient impact bar. The third resilient impact bar is removable from the impact bed without removing the first resilient impact bar or second resilient impact bar from the impact bed.

11 Claims, 7 Drawing Sheets

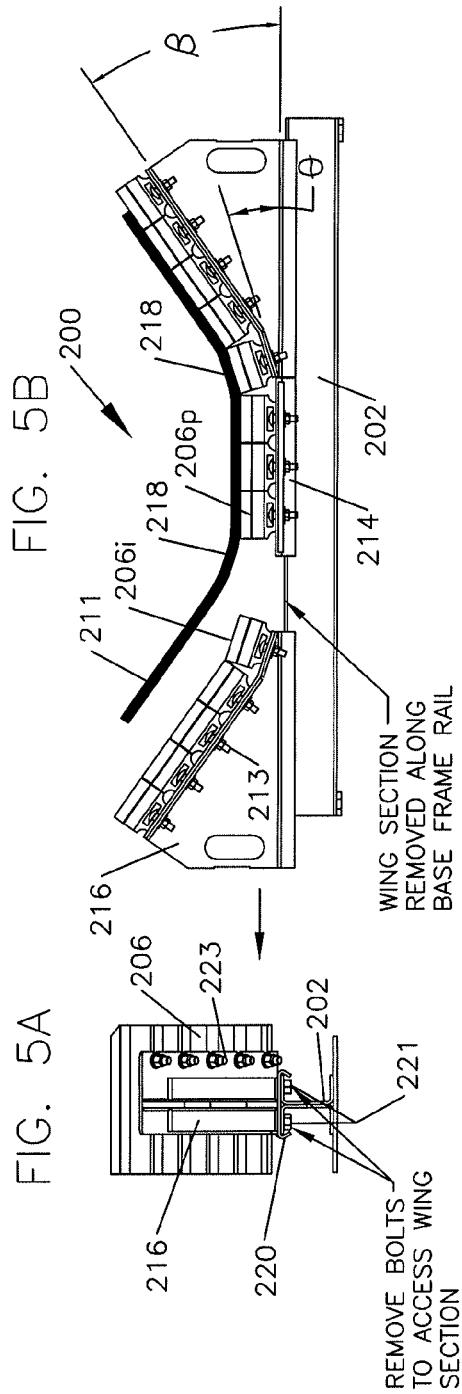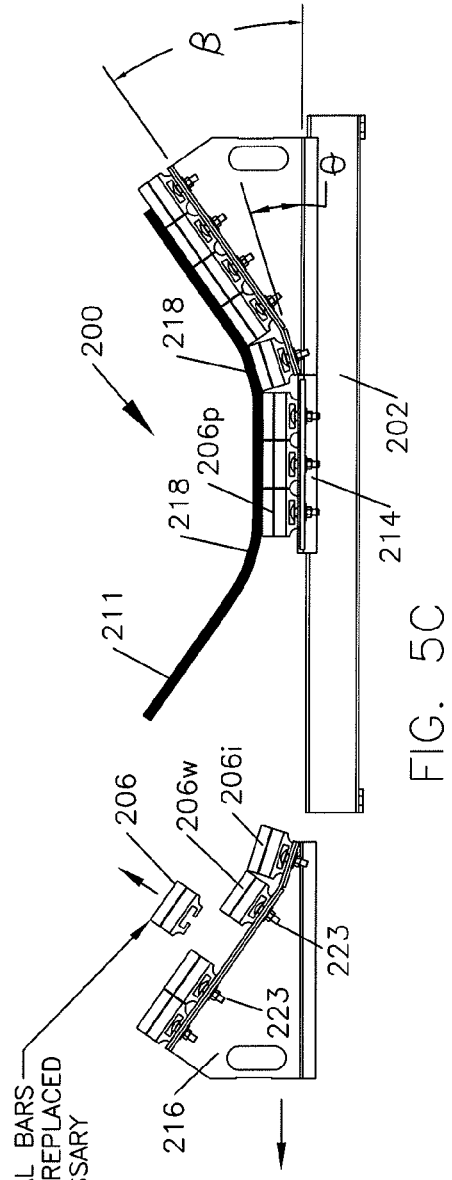

| Dimensions (inches) | | | | | | | | | Number of Bars |
|---|---|---|---|---|---|---|---|---|---|
| A | B | C | D | | | E | | | |
| | | | 20° | 35° | 45° | 20° | 35° | 45° | |
| 27 | 29.0 | 8.06 | 10.81 | 12.44 | 13.88 | 21.88 | 19.56 | 17.94 | 6 |
| 33 | 35.0 | 8.19 | 11.63 | 13.69 | 15.00 | 27.63 | 24.81 | 22.75 | 6 |
| 39 | 41.0 | 8.19 | 12.31 | 14.88 | 16.44 | 33.44 | 30.06 | 27.63 | 6 |
| 45 | 47.0 | 8.19 | 13.00 | 16.13 | 17.88 | 39.19 | 35.38 | 32.44 | 9 |
| 51 | 53.0 | 8.56 | 14.06 | 17.56 | 19.63 | 44.94 | 40.63 | 37.25 | 9 |
| 57 | 59.0 | 8.56 | 14.75 | 18.81 | 21.06 | 50.69 | 45.94 | 42.06 | 12 |
| 63 | 65.0 | 9.00 | 15.88 | 20.25 | 22.88 | 56.44 | 51.81 | 46.94 | 12 |
| 69 | 71.0 | 9.00 | 16.56 | 21.44 | 24.31 | 62.19 | 56.50 | 51.75 | 15 |
| 81 | 83.0 | 11.25 | 20.44 | 26.38 | 29.69 | 76.56 | 69.44 | 63.06 | 18 |
| 93 | 95.0 | 11.50 | 22.06 | 29.88 | 32.75 | 88.06 | 80.00 | 72.75 | 21 |
| 105 | 107.0 | 11.50 | 23.44 | 31.19 | 35.56 | 99.56 | 90.65 | 82.44 | 24 |

FIG. 6

CONVEYOR BELT CRADLE IMPACT BED

This application claims priority to U.S. Provisional Application No. 61/697,589 filed Sep. 6, 2012, the disclosure of which is incorporated herein by reference in its entirety.

BACKGROUND OF THE INVENTION

1. Field of Invention

This invention relates generally to conveyor systems principally used in the mining and material handling industry. More particularly, the invention relates to the design of conveyor impact beds often used to support a conveyor belt in a loading zone, where soil, rocks, gravel and other aggregate material drops onto a conveyor belt.

2. Description of Related Art

Conveyor belts are used in a variety of industries to transport materials from one place to another. Generally, materials are deposited at one end of a conveyor and are transported to the other end, where they are discharged or otherwise removed from the conveyor belt. The belts used are often robust, but are susceptible to damage from a variety of sources. While discharge of materials from a conveyor belt does not usually damage the belt, the act of depositing goods and materials onto a conveyor belt has the potential to cause damage. In this regard, when a belt is being used to transport coal, aggregate and other coarse and heavy material, the deposit of these types of materials onto the belt can generate tremendous impact forces on the belt. For instance, with a 100 lb mass having drop distance of 10 feet from a discharge chute onto a conveyor belt, there is 1,000 ft-pounds of force impacting the belt.

It is standard in the industry to provide an impact bed to support and protect the conveyor belt in the loading zone. An impact bed is an apparatus which is installed below the area of the conveyor belt on which heavy loads are deposited, and absorbs the impact forces generated thereby, as discussed above. Typical impact beds include a plurality of support members longitudinally spaced from each other under the area of the belt in the loading zone. These support members have a plurality of resilient impact bars secured thereto, which extend thereacross running lengthwise in the belt travel direction. The bars absorb the impact forces and decrease the acceleration of the materials or rocks dropped onto the belt.

The support members and impact bars supported thereby typically provide a trough configuration for the belt. This prevents aggregate materials from spilling over the edges of the belt as such materials are discharged onto, and transported along the belt. The support members typically include a planar portion, which supports the impact bar(s) in a flat configuration, and inclined angled wings on both sides of the planar portion. Each inclined angled wing supports the impact bar(s) at a troughing angle relative to the planar portion.

The resilient bars are subject to wear and damage over repeated impacts with the belt and thus need to be serviced and/or replaced on a regular basis. In addition, the belt tends to experience significant wear and damage, particularly at the belt junction between impact bars supported by the planar portion and impact bars supported by the angled wing portion. Accordingly, there exists a need for a means to minimize damage at the belt junction of impact beds.

BRIEF SUMMARY OF THE INVENTION

In accordance with the present invention, there is provided an impact bed for supporting a conveyor belt in a troughing configuration. The impact bed has a plurality of resilient impact bars running lengthwise in a travel direction of the conveyor belt. The plurality of resilient impact bars includes at least a first resilient impact bar having a planar orientation, a second resilient impact bar having a troughing angled orientation and a third resilient impact bar between the first resilient impact bar and second resilient impact bar. The third resilient impact bar has an intermediate angled orientation that is greater than the planar orientation of the first resilient impact bar and less than the troughing angled orientation of the second resilient impact bar. The third resilient impact bar is removable from the impact bed without removing the first resilient impact bar or second resilient impact bar from the impact bed.

BRIEF DESCRIPTION OF SEVERAL VIEWS OF THE DRAWINGS

The invention will be described in conjunction with the following drawings in which like reference numerals designate like elements and wherein:

FIG. 5A is a side view of a wing of the impact bed of FIG. 4;

FIG. 5B is an end elevational view of the impact bed of FIG. 4 illustrating separating of a wing from the impact bed;

FIG. 5C is an end elevational view of the impact bed of FIG. 4 wherein a wing thereof is fully separated from the impact bed; and FIG. 6 is a chart showing preferred dimensions of the SLIDE-N-SEAL impact bed.

DETAILED DESCRIPTION OF THE INVENTION

Figure 1:
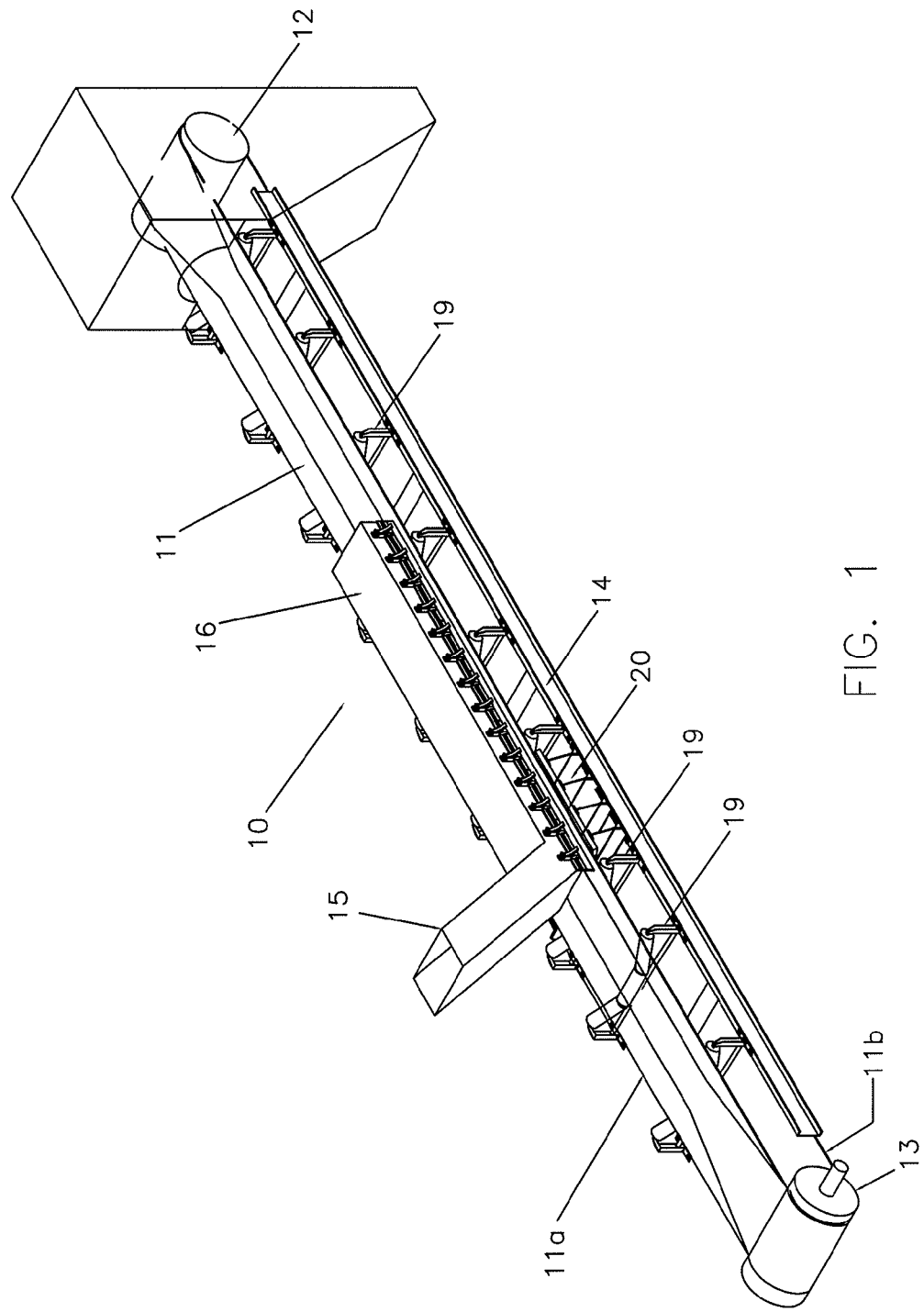
FIG. 1 is a perspective view of an endless conveyor assembly for conveying material.

Referring now in detail to the various figures of the drawings wherein like reference numerals refer to like parts, there is shown in FIG. 1 an endless conveyor belt assembly generally designated 10. The endless conveyor belt assembly 10 includes an endless troughing conveyor belt 11 extending around a head pulley 12 and a tail pulley 13, providing a carry side 11a and a return side 11b for the belt, which is supported by a belt support frame 14. There is provided along the belt support frame 14, a plurality of belt supports 19 supporting the conveyor belt 11 between the head pulley 12 and the tail pulley 13. The conveyor belt 11 is designed to transport aggregate or particulate material that is loaded onto the conveyor belt through a chute 15 in a loading zone 16. An impact bed 20 supports the belt 11 in the loading zone 16, in a manner as described above. The conveyor belt 11 carries the material away from the loading zone 16 and discharges the material at the head pulley 12 area.

Figure 2:
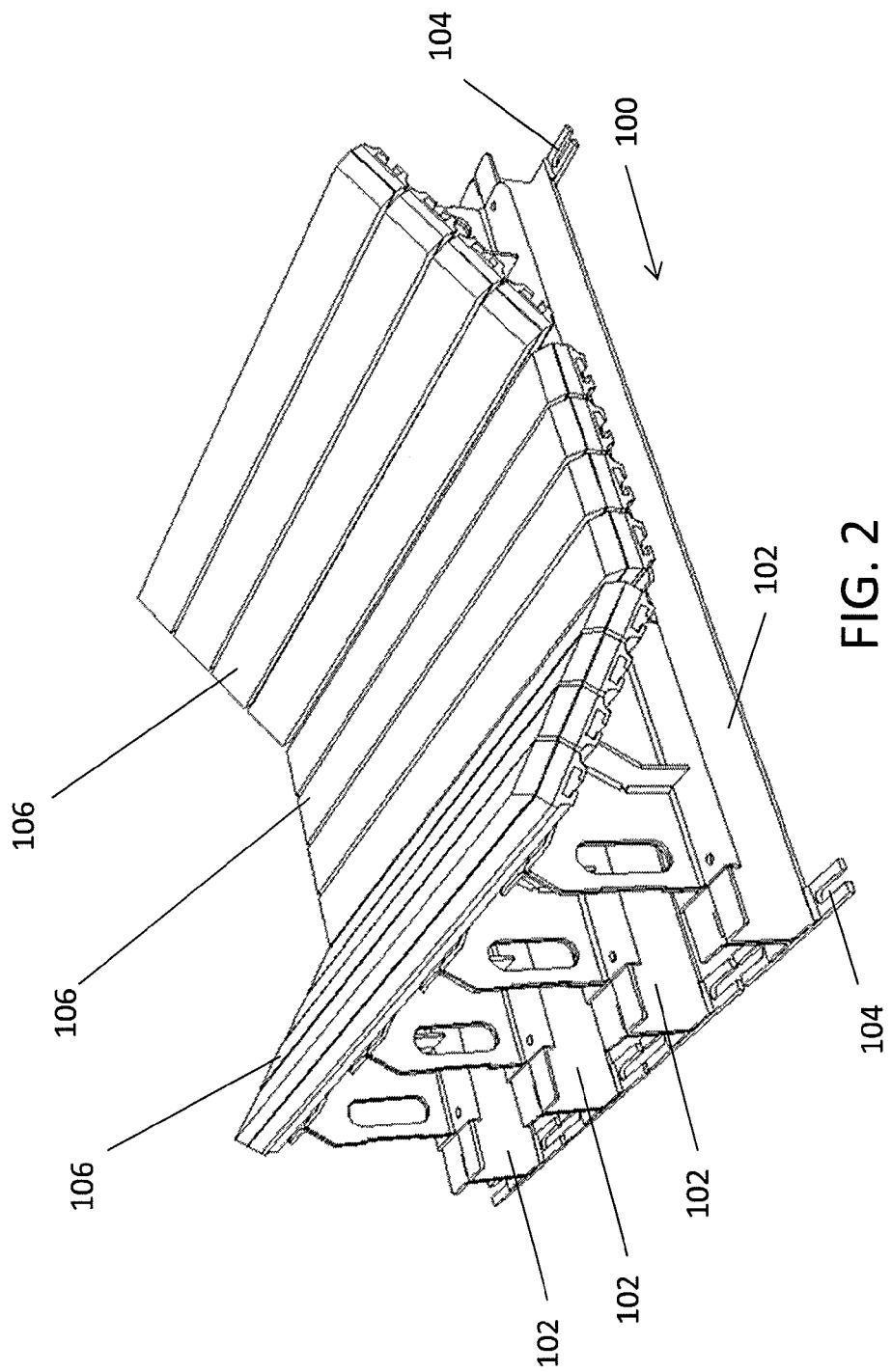
FIG. 2 is a perspective view of a typical impact bed.

Referring now to FIG. 2, there is shown a perspective view of a preferred and typical impact bed 100—the SLIDE-N-SEAL made by ASGCO®. The impact bed 100 includes support members 102, which are longitudinally spaced from each other and are secured to the belt support frame 104. Twelve resilient impact bars 106 are secured to and extend across the support members 102, running lengthwise in what would be the conveyor belt travel direction. The impact bed 100 may include fewer or greater than twelve impact bars 106, depending, e.g., on the nature of the materials being carried by the conveyor belt, the length of the belt and desired troughing angle. The impact bars 106 are each preferably about 4 inches wide.

Figure 3:
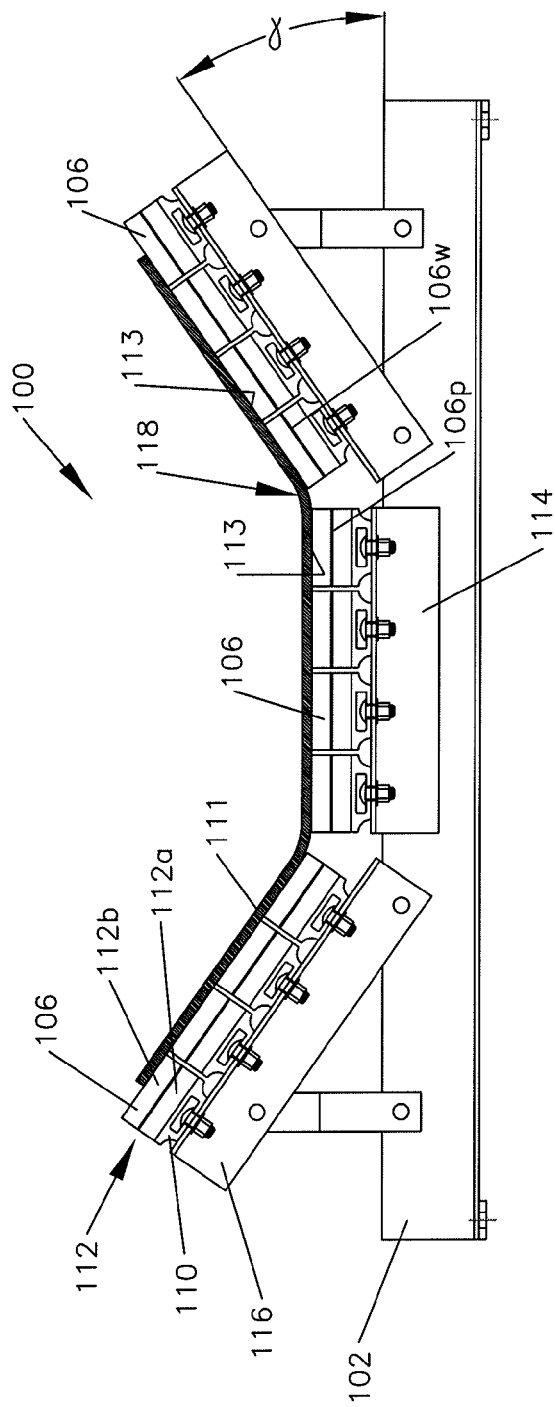
FIG. 3 is an end elevational view of the impact bed of FIG. 2.

Referring now to FIG. 3, there is shown an end elevational view of the impact bed 100 of FIG. 2, with a conveyor belt 111 resting thereon. Each impact bar 106 includes an attachment portion 110 and resilient portion 112. The attachment portion 110 is preferably metal, e.g., steel, and is operable to secure the impact bar 106 to the support member 102. The resilient portion 112 may include one or more resilient and durable materials adapted to absorb impact forces associated with deposit of aggregate material onto the conveyor belt 111 atop the impact bed 100, discussed above. Preferably, the resilient portion 112 includes an intermediate shock-absorbing layer 112a, made, e.g., from rubber (preferably about 40 durometer), and a belt-contacting layer 112b, made from a resilient, wear resistant material having low coefficient of friction, e.g., ultra-high-molecular-weight polyethylene or the material sold under the name ASGCO-LENE by ASGCO®. In a preferred embodiment, the shock-absorbing layer 112a is a 1 inch thick layer of rubber and the belt-contacting layer 112b is a 1 inch thick layer of ASGCO-LENE.

The impact bed 110 provides a troughing configuration for the conveyor belt 111, for reasons explained above. To this end, each support member 102 includes a central flat (i.e., preferably 0°) planar portion 114 and an upwardly angled wing 116 extending from each side of the central planar portion 114. The angle α represents the troughing angle between the central planar portion 114 and each wing 116. Standard troughing angles are often preset at 20°, 35° or 45°, but can be lesser, greater or in-between depending on the application.

As shown in FIGS. 2 and 3, impact bars 106 are secured to the central planar portion 114 and each wing 116. The impact bars 106 preferably have essentially flat top surfaces 113. The top surface 113 of a respective impact bar 106 generally follows the angular orientation of the portion 114,116 of the support member 102 supporting the impact bar 106. For example, the top surface 113 of the impact bar 106p supported by the central planar portion 114 and adjacent to the wing 116, generally follows the angular orientation of the central planar portion 114, i.e., preferably 0°. The top surface of the impact bar 106w supported by the wing 116 and adjacent to the central planar portion 114, generally follows the angular orientation of the wing 116, i.e., preferably the troughing angle α.

Figure 3A:
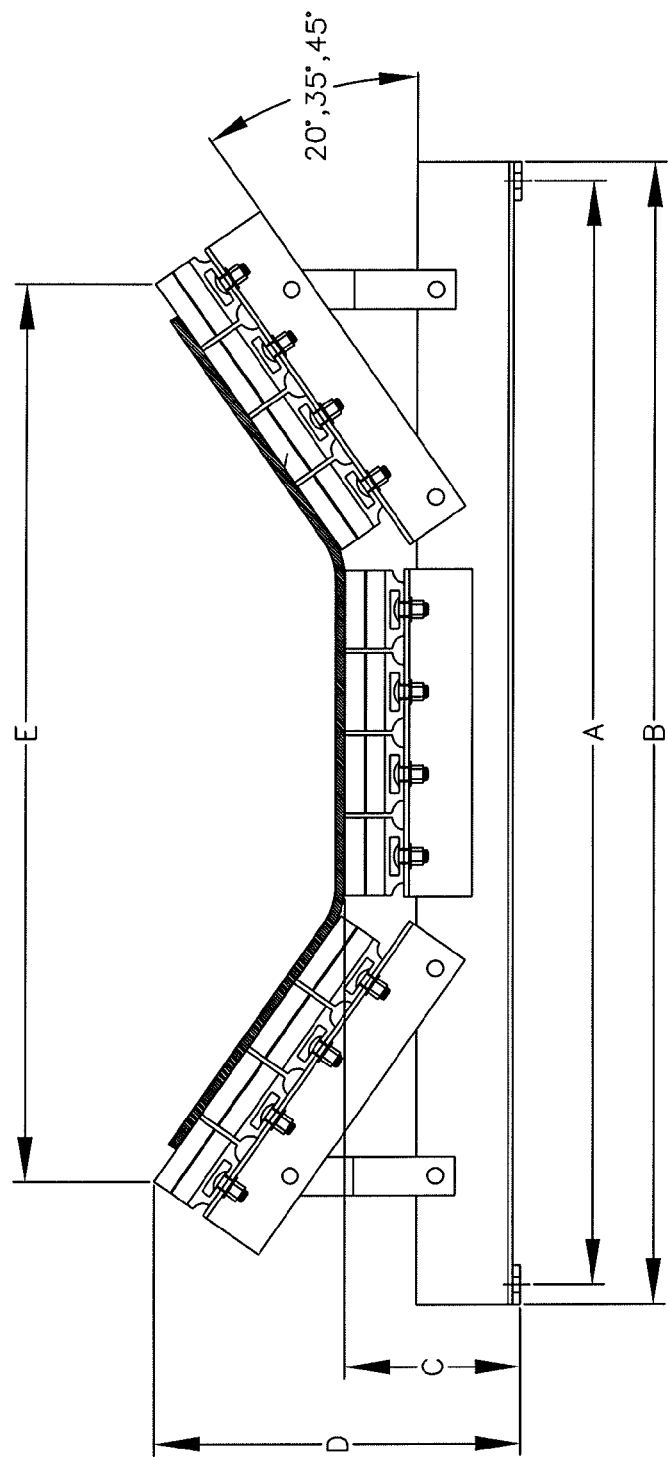
FIG. 3A is an end elevational view of the SLIDE-N-SEAL impact bed, illustrating preferred dimensions of the same.

Preferred dimensions of the SLIDE-N-SEAL (depending on application and desired troughing angle) are provided in FIG. 6, wherein letters A, B, C, D, and E refer to dimensions that are shown in FIG. 3A.

Through use, the impact bars 106 can become worn and in need of replacement. A process for removing and replacing worn impact bars is described below.

As shown in FIG. 3, there exists a gap and a relatively abrupt angular change at the belt junction 118, i.e., the junction of the conveyor belt 111 between impact bars 106p and 106w. While the impact bed 110 has proven to work very well in absorbing impact forces and protecting the conveyor belt, it has been found that significant wear and damage to the belt 111 can sometimes concentrate at the belt junction 118.

Figure 4:
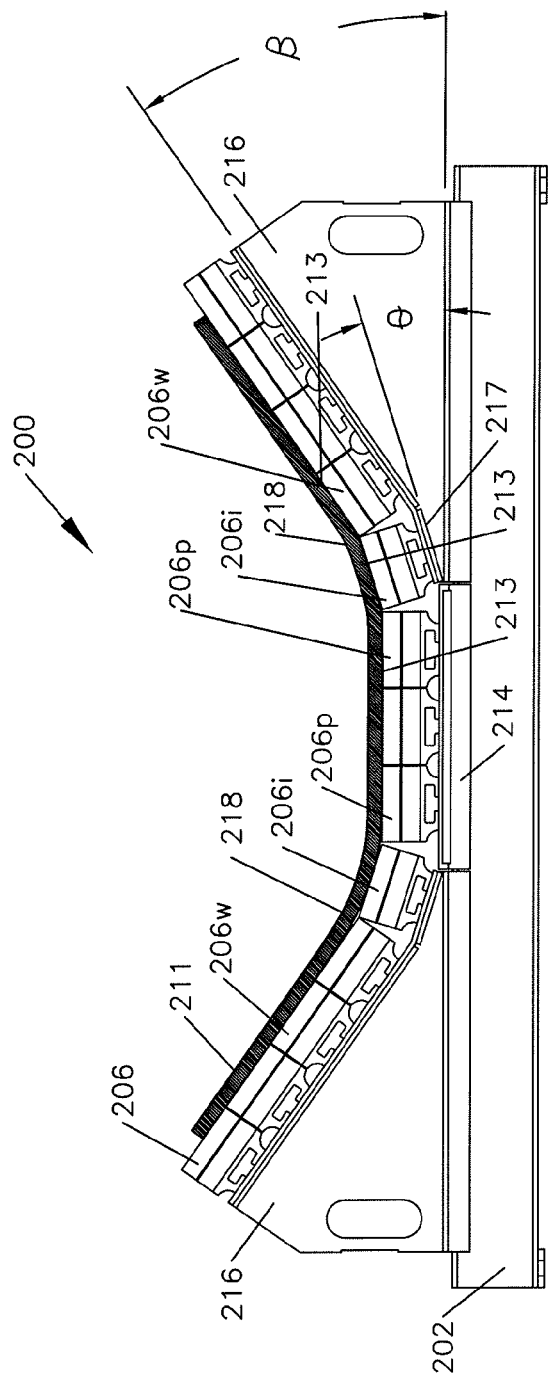
FIG. 4 is an end elevational view of an exemplary impact bed of the present invention.

Accordingly, FIG. 4 shows an end elevational view of an exemplary impact bed 200 of the present invention, which is designed to ameliorate the wear and damage that can sometimes concentrate at the belt junction of prior impact beds. The impact bed 200 shown in FIG. 4 is identical to that of FIGS. 2 and 3 in a number of respects. For example, the impact bed 200 includes support members 202, which are longitudinally spaced from each other and are secured to the belt support frame. Resilient impact bars 206 are secured to and extend across the support members 202, running lengthwise in the conveyor belt 211 travel direction. The makeup and properties of the resilient impact bars 206 can be identical to those of the bars 106 shown in FIGS. 2 and 3.

To provide a troughing configuration for the conveyor belt 211, each support member 202 includes a central planar portion 214, an upwardly angled wing 216 and an intermediate angled portion 217 located between each wing 216 and the central planar portion 214. The intermediate angled portion 217 supports an impact bar 206i at the belt junction 218 between impact bar 206p (supported by the central planar portion 214) and impact bar 206w (supported by the wing 216). Thus, whereas there is a gap (i.e., absence of underlying support) at the belt junction 118 of the impact bed 100 shown in FIGS. 2 and 3, the impact bar 206i of the impact bed 200 shown in FIG. 4 fills in that gap by providing underlying support at the belt junction 218.

In addition, the intermediate angled portion 217 and impact bar 206i supported thereby, provide an intermediate angle θ. Intermediate angle θ is greater than the preferably 0° central planar portion 214 and top surface 213p of the impact bar 206p supported thereby, but preferably less than the troughing angle β of the wing 216 and top surface 213w of the impact bar 206w supported thereby. Accordingly, the intermediate angle θ of the impact bar 206i provides a more gradual angular change at the belt junction 218 than is provided by prior impact beds. By providing a more gradual angular change and support at the belt junction 218, the intermediate angled portion 217 and impact bar 206i help protect the belt 211 from wear and damage at the belt junction 218.

It is preferred that the intermediate angle θ is half the value of the troughing angle β. For example, if the troughing angle β is 45°, the intermediate angle θ is preferably 22.5°. If the troughing angle β is 35°, the intermediate angle θ is preferably 17.5°. If the troughing angle β is 20°, the intermediate angle θ is preferably 10°. Nevertheless, the present invention may include configurations wherein the intermediate angle θ is less than or greater than half the value of the troughing angle β. In addition, the present invention may also include configurations having more than one intermediate angle and/or more than one impact bar 206i between the central planar portion 214 and the wing 216.

When the impact bars 206 become worn through use, they can be removed and replaced as shown in FIGS. 5A-5C. FIG. 5A shows a side view of a portion of the wing 216 of the impact bed 200. The wing 216 is retained to the support member 202 with fasteners, e.g., bolts 221. The wing includes a sliding member 220, which, when the wing 216 is released, is slidable along the length of the support member 202. To release the wing 216, the bolts 221 are removed, allowing the wing 216 (via the sliding member 220) to be slid away (e.g., pulled) from the center of the impact bed 200, as shown in FIG. 5B.

FIG. 5C shows the wing 216 fully separated from the rest of the impact bed 200. In this position, the conveyor belt 211 no longer covers the impact bars 206 located on the wing 216, allowing a user to access the bars 206 for removal and replacement. An individual impact bar 206 may be removed from the wing 216 by removing a bolt 223 that retained the impact bar 206 to the wing 216 and lifting the impact bar 206 off of the wing 216. In this way, a user may remove and replace the impact bar 206i at the belt junction 218 in a simple manner, without having to remove immediately adjacent impact bars 206w or 206p to gain access to impact bar 206i. In an alternative embodiment (not shown), the impact bar 206i at the belt junction 218 may be attached to the planar portion 214 such that sliding of the wing 216 away from the planar portion 216 would not separate the impact bar 206i from the planar portion.

While the invention has been described in detail and with reference to specific examples thereof, it will be apparent to one skilled in the art that various changes and modifications can be made therein without departing from the spirit and scope thereof.

What is claimed is:

1. An impact bed for supporting a conveyor belt in a troughing configuration, the impact bed comprising a plurality of resilient impact bars running lengthwise in a travel direction of the conveyor belt, the plurality of resilient impact bars including at least a first resilient impact bar having a planar orientation, a second resilient impact bar having a troughing angled orientation and a third resilient impact bar between the first resilient impact bar and second resilient impact bar, the third resilient impact bar having an intermediate angled orientation that is greater than the planar orientation of the first resilient impact bar and less than the troughing angled orientation of the second resilient impact bar, wherein the third resilient impact bar is removable from the impact bed without removing the first resilient impact bar or second resilient impact bar from the impact bed.

2. The impact bed of claim 1, wherein each of the plurality of resilient impact bars comprises an attachment portion which is secured to a support member and a resilient portion on top of the attachment portion, the resilient portion comprising a durable shock-absorbing material.

3. The impact bed of claim 2, wherein the resilient portion comprises an intermediate shock-absorbing layer and a belt-contacting layer on top of the intermediate shock-absorbing layer, the belt-contacting layer comprising a resilient, wear resistant material having a low coefficient of friction.

4. The impact bed of claim 3, wherein the shock-absorbing layer comprises rubber and the belt-contacting layer comprises an ultra-high-molecular-weight polyethylene.

5. The impact bed of claim 1, wherein the plurality of resilient impact bars are secured to longitudinally spaced support members, each support member including a central flat planar portion supporting the first resilient impact bar, an upwardly angled wing extending from each side of the central planar portion, the angled wing supporting the second resilient impact bar and an intermediate angled portion located between the angled wing and the planar portion, the intermediate angled portion supporting the third resilient impact bar.

6. The impact bed of claim 5, wherein the angled wing is releasable and slidable along the support member.

7. The impact bed of claim 6, wherein the angled wing, when slid outwardly away from the conveyor belt, separates the angled wing from the planar portion, rendering the third resilient impact bar accessible for removal.

8. The impact bed of claim 1, wherein the troughing angled orientation of the second resilient impact bar is about 35° relative to the planar orientation of the first resilient impact bar.

9. The impact bed of claim 1, wherein the intermediate angled orientation of the third resilient impact bar is about half of the troughing angled orientation of the second resilient impact bar.

10. A method for ameliorating wear and damage at a belt junction of an impact bed, the impact bed impact bed comprising a plurality of resilient impact bars running lengthwise in a travel direction of the conveyor belt, the plurality of resilient impact bars including at least a first resilient impact bar having a planar orientation and a second resilient impact bar having a troughing angled orientation, the belt junction being located on the conveyor belt between the first resilient impact bar and second resilient impact bar, the method comprising providing a third resilient impact bar underneath the conveyor belt to provide support to the conveyor belt at the belt junction, the third resilient impact bar having an intermediate angled orientation that is greater than the planar orientation of the first resilient impact bar and less than the troughing angled orientation of the second resilient impact bar.

11. The method of claim 10, wherein the third resilient impact bar is removable from the impact bed without removing the first resilient impact bar or second resilient impact bar from the impact bed.

* * * * *